R. ROWLEY & J. J. COOMBER.
TIRE SHOE BUILDING APPARATUS.
APPLICATION FILED APR. 21, 1910.
991,458.
Patented May 2, 1911.
4 SHEETS—SHEET 1.
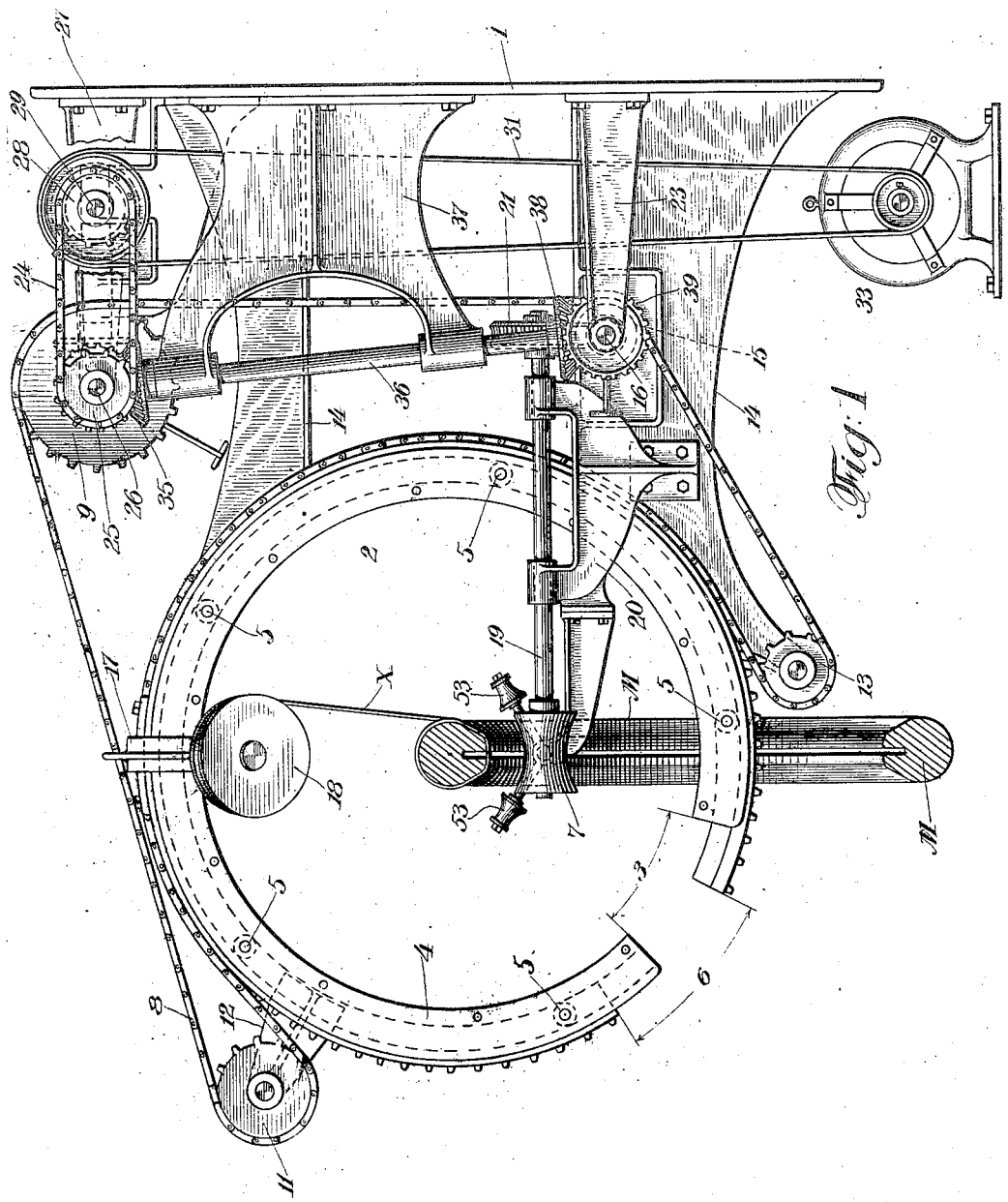
Witnesses:
J. E. Nares.
G. Blake
Inventors
Robert Rowley
James J. Coomber
Edward S. Black
Attorney

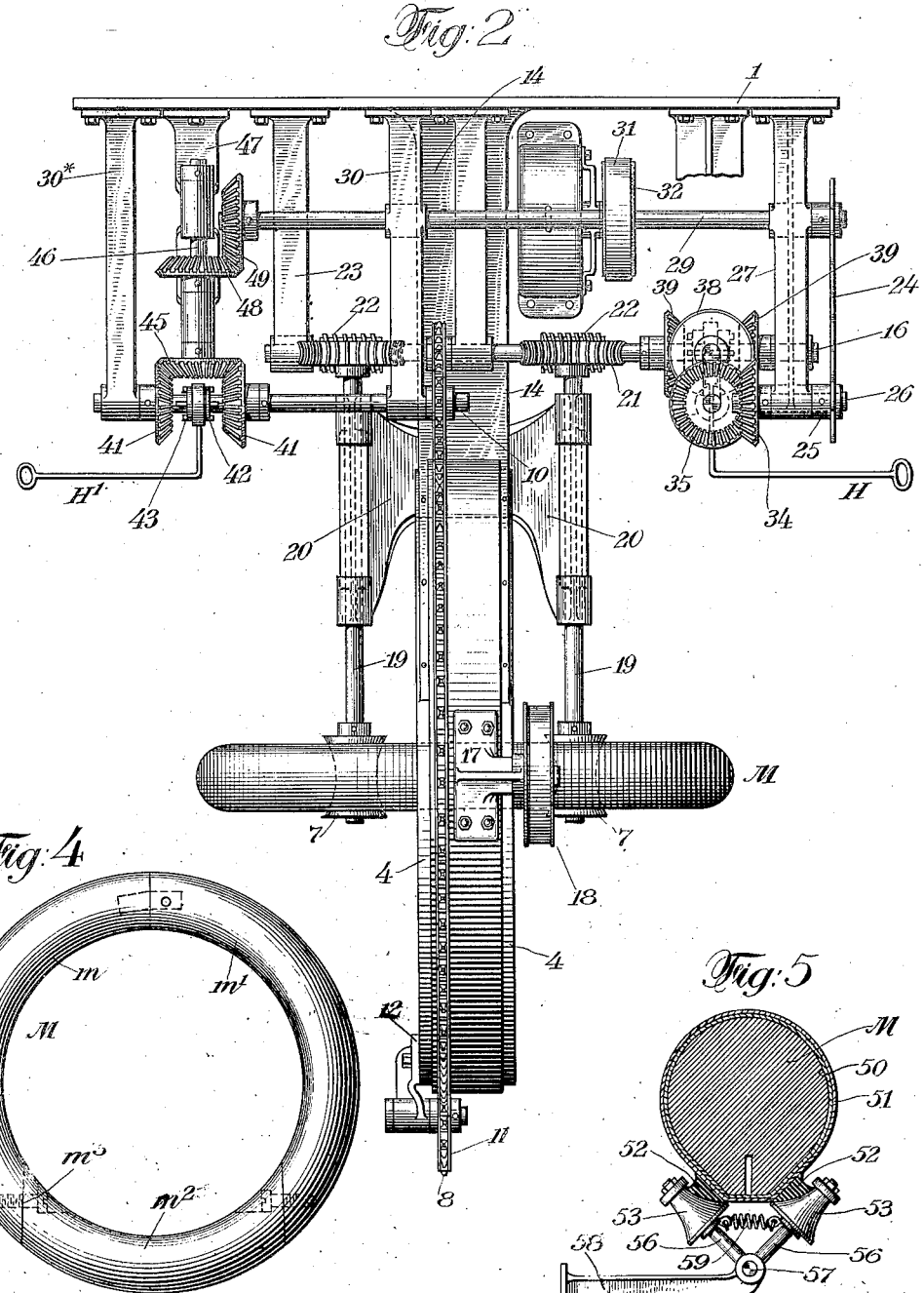

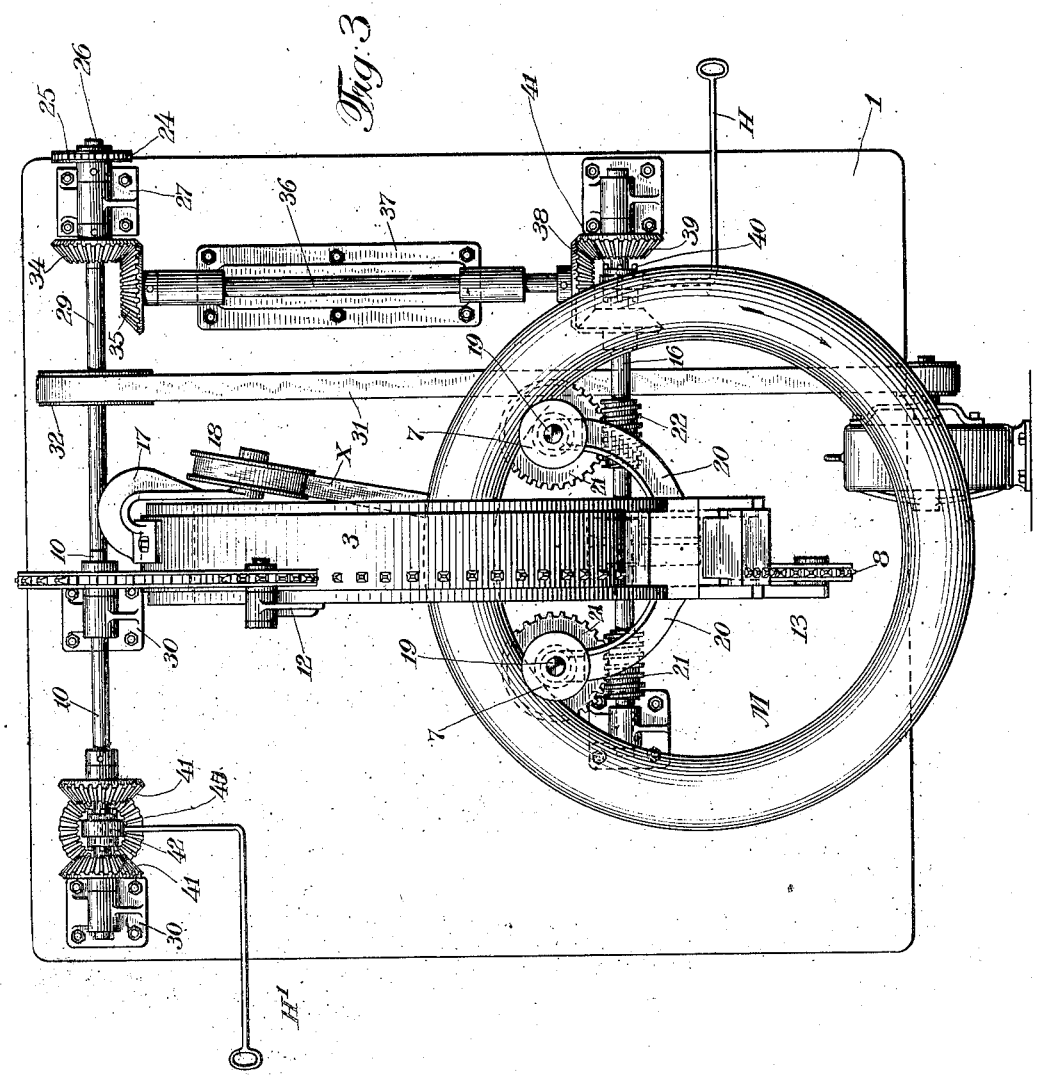

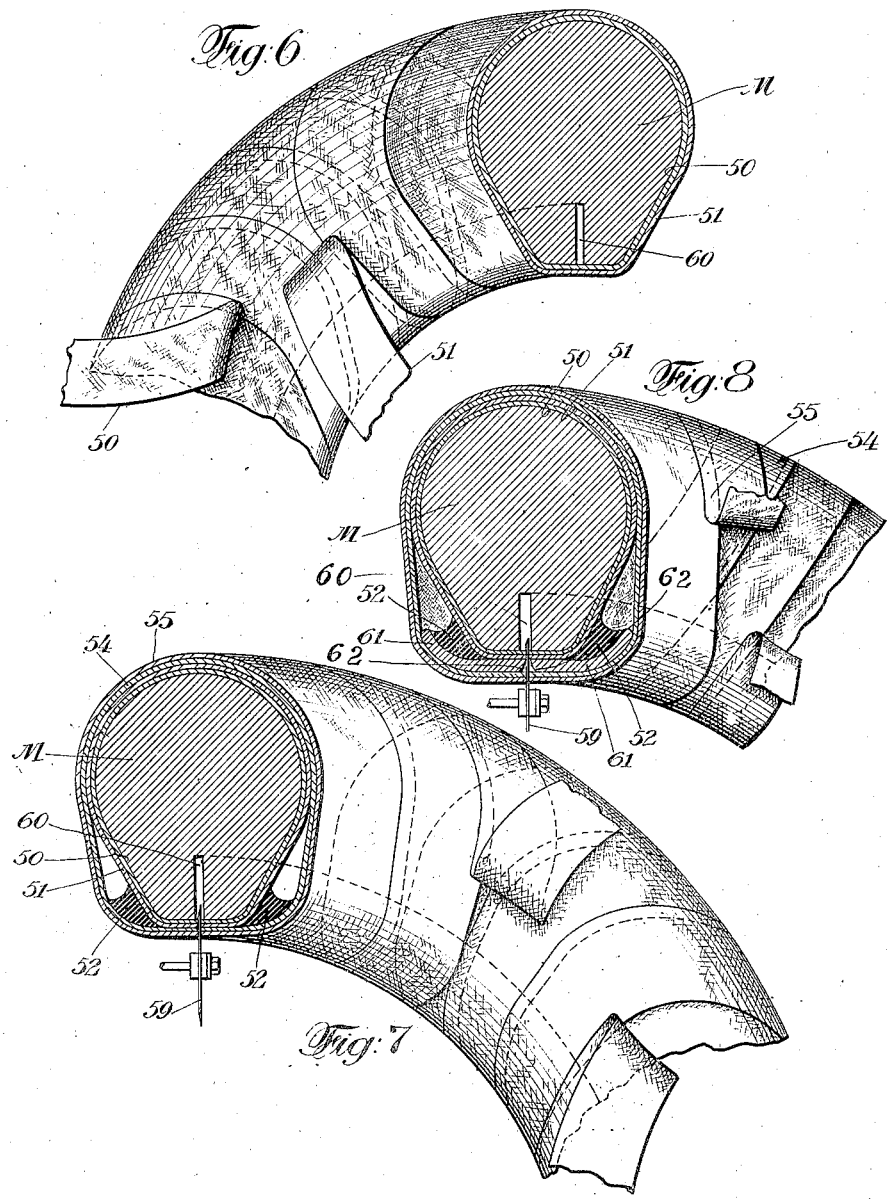

UNITED STATES PATENT OFFICE.

ROBERT ROWLEY, OF NEW YORK, N. Y., AND JAMES J. COOMBER, OF JERSEY CITY, NEW JERSEY.

TIRE-SHOE-BUILDING APPARATUS.

991,458. Specification of Letters Patent. Patented May 2, 1911.

Application filed April 21, 1910. Serial No. 556,792.

*To all whom it may concern:*

Be it known that we, ROBERT ROWLEY, a citizen of the United States, residing at New York city, in the county of New York and State of New York, and JAMES J. COOMBER, a citizen of the United States, residing at Jersey City, in the county of Hudson and State of New Jersey, have invented certain new and useful Improvements in Tire-Shoe-Building Apparatus, of which the following is a specification, reference being had therein to the accompanying drawings.

The main object of this invention is to produce a machine for building up tire-shoe carcasses out of suitable flat tape or strips of tire-forming material, by winding transversely and circumferentially around an annular mandrel to form an endless tube of superimposed material that can be cut around its inner periphery to convert the endless tube into tire-shoe form.

The machine herein illustrated is adapted to carry out the method and in making the tire-shoe set forth in our pending application Serial No. 551,440, filed March 25, 1910, but is useful otherwise than for reverse-spiral winding therein referred to.

There are tire-shoe-making machines known to us that are constructed for the purpose of carrying out the old and well-known hand process of making tire-shoes out of bias-cut, and therefore weakened, friction fabric by stretching strips thereof circumferentially around the outer periphery of the mandrel, one strip on another, and "stitching" or rubbing down the free margins of the bias-cut strips, as successively applied, along and around the covered sides of the mandrel, to which the strips are conformable in consequence of their elasticity due to the bias cutting.

Advantages of our process, of use of our machine and of the product are: considerable savings in cost of manufacture; increased and novel uniform density of the carcass due to the transverse winding under high tension; increased strength of the tape-like strips (which we prefer to use rather than cord,) employed in building up the carcass, and which may, and for the best results ought to, be straight cut and not bias cut; and increased strength of the sides of the completed shoe, the sides of shoes as heretofore built on such machines being the least dense and consequently the weakest portions of the shoes, where "blow-outs" most frequently occur. It is further noted that when ordinary woven fabric is cut on the bias, a number of lap-jointed pieces are usually required to secure a strip long enough to extend circumferentially around an annular tire-shoe mandrel, and that these joints are objectionable; whereas, according to our invention, in its preferred form, straight-cut strips as long as the goods from the mill, are readily obtained, of any desired width. Such straight-cut strips are estimated to be more than twenty per cent. stronger than otherwise corresponding bias-cut strips, and are obtained with much less labor and no waste of stock. The strips or tape are of course frictioned, that is, treated with vulcanizable rubber; and our invention will be particularly described with reference to the building-up of clencher bead shoe carcasses.

Our present machine, in addition to being useful for building up shoe carcasses, is also useful in winding the shoe carcasses for open-cure vulcanization, and in this respect is in physical form somewhat like, as we are informed, a certain Moseley tire-winding machine built at Providence, R. I., from the drawings of an English machine prior to 1906, and from which the well known Hartford Rubber Works winding machine was developed; and the machine shown in Miller's U. S. Patent No. 840,642. We are also aware of British Patent No. 5430 of March 5, 1908, to Swain and Swain, and of their British Patent No. 27,486 of 1898 relating to tires. We are also aware of United States Patents No. 351,584 to Dixon, October 26, 1886; No. 700,713 to Wright, May 20, 1902, both for wrapping coils of wire; and No. 791,081 to Davis, May 30, 1905, for taping machines; and disclaim all that is shown in them.

In the accompanying drawings, illustrating the principle of our invention and the best mode now known to us of applying that principle, Figure 1 is a side elevation, Fig. 2 a top-plan view, and Fig. 3 a front elevation of our machine. Fig. 4 is a side elevation of a circumferentially collapsible, annular mandrel. Fig. 5 is a view partly in transverse section through the mandrel, a foundation winding thereon, and vulcanizable clencher beads, and partly in side elevation to show the bead ring rolls in working position, and the mandrel in which they are held on a bracket. Fig. 6 is a view partly in perspective and partly in section, and illustrates a portion of the mandrel and foundation winding for application of a pair of annular, vulcanizable rubber bead rings; the mandrel being shown with an inner circumferential cutter-receiving slot, Fig. 7 is a view similar to Fig. 5, but shows the clencher bead rings in place and covered by the final winding; the mandrel's circumferential cutter-receiving slot receiving a cutting-disk by means of which the annular tube is cut around its inner periphery into shoe-form on the disk passing through the fabric into the mandrel slot. Fig. 8 is a side view similar to Fig. 7, but shows, in transverse section, a pair of annular, removable bead ring supports that may be used, if desired, as a part of the apparatus.

Referring to the drawings, 1 is a main-frame provided with a projecting, stationary, circularly arcuate spool-carrier support 2, on the outer periphery of which the circularly arcuate spool-carrier 3 is rotatably mounted, being held thereon laterally by the side rings 4 of the support, these rings projecting beyond the outer peripheral wall of the support to form a guideway in which the spool-carrier is located. Anti-friction rolls 5 are desirably placed between opposed peripheral walls of the support and carrier; and the support and carrier are formed with front openings 6 through their sides of a width sufficient to permit the lateral passage therethrough of an annular shoe-forming mandrel M, which is rotatively supported by a pair of horizontal, peripherally dished rolls 7, the mandrel hanging thereon.

The spool-carrier is preferably in the form of a circularly arcuate sprocket-wheel, and is rotated by an endless sprocket-chain 8 that runs over a sprocket drive-wheel 9 on a spool drive-shaft 10 of the machine and also over idler sprocket 11 journaled in a rigid bracket 12 fast to the stationary support 2, and over an idler sprocket 13 journaled in the lower of the two brackets 14 of frame 1, and over a third idler sprocket 15 on shaft 16. Brackets 14, 14 carry the spool-carrier support 2. These sprocket-wheels are rearward of the front openings 6, and hence the sprocket-chain 8 does not cross the openings, and therefore does not interfere with the insertion or removal of the mandrel M which encircles the lower arc of support 2 and carrier 3, the relative planes of the mandrel and spool-carrier, one in relation to the other, being at substantially right angles one to the other. Drive-shaft 10 is journaled in brackets 30 and 30* of the frame.

The spool-carrier or sprocket 3 has a spool-carrying bracket 17 fixed to it and projecting laterally of it, so that the spool 18, journaled in the bracket, overhangs the mandrel, and tape x on the spool may pass to the mandrel in operation, permitting the tape to be wound reverse-spirally, circumferentially and transversely around the mandrel, under tension, depending on the rotative movements of the mandrel and spool-carrier one to the other.

The mandrel is rotatively supported, as stated, on a pair of parallel rolls 7 having dished peripheries. These are located one on one side and the other on the other side of the spool-carrier and its support, parallel with the sides thereof. The mandrel hangs on these supports, and its weight suffices to insure its rotation by frictional engagement with rolls 7 when the latter are rotated. Each roll is fixed on a horizontal shaft 19 journaled in a bracket 20 fast to the main-frame. On the rearward end of each shaft 19, a worm gear 21 is fixed, each meshing with a worm 22 on the shaft 16, which extends transversely of the machine and is journaled in brackets 23, 23 of the main-frame.

The pitch of the teeth of the worm gears and worms is such that the two rolls 7, 7 are rotated in the same direction to rotate the mandrel. The shaft 16 is rotated as follows: An endless sprocket-chain 24 extends from a sprocket 25 fixed on stud 26 journaled in bracket 27 of the main-frame, to a sprocket 28 fixed on transverse driving-shaft 29 journaled in brackets 27 and 30 of the frame; and shaft 29 is driven in any suitable manner, as by a belt 31 from its fixed pulley 32 to a motor 33.

Stud 26 carries a fixed bevel-gear 34 which meshes with a bevel-gear 35 on the upper end of a slanted, upright shaft 36 journaled in bracket 37 of the frame (Fig. 3). The lower end of shaft 36 carries a fixed bevel-gear 38 that is in constant mesh with two bevel-gears 39, 39, each loose on shaft 16 and having between them a shiftable clutch member 40 slidable on shaft 16 and having interlocking pins 41 on each side, adapted to engage one or another set of recesses in gears 39, as will be readily understood without particular illustration, so as to rotate shaft 16, and consequently the mandrel, in either direction at the will of the operator. Clutch 40 has a handle H, and may be called the mandrel drive and shift mechanism.

To rotate shaft 10, and consequently the spool-carrier, in either direction, at will, shaft 10 is provided with a pair of loose bevel-gears 41, 41, between which, on shaft 10, a clutch member 42 is slidably mounted and provided with pins 43 to engage one or another set of recesses in gears 41, which are in constant mesh with a bevel-gear 45 on a shaft 46 journaled in a bracket 47 of the frame and having at its rearward end a fixed bevel-gear 48 that meshes with bevel-gear 49 fast on the shaft 29. Clutch 42 is provided with a handle H', and may be called the spool drive and shift mechanism.

By the mechanism described, the spool may be carried transversely around the mandrel, laying the tape or strip spirally or otherwise while the mandrel is rotated. Preferably, for the purpose now particularly intended, the spool is canted, as shown, so that the tape or strip is led to the mandrel at an angle, as shown in Fig. 3, whereby spiral winding is facilitated. When a sufficient number of reverse-spiral windings 50 and 51 have been laid on the mandrel to form a foundation tube for the clencher bead strips 52, straight pieces of vulcanizable rubber of proper cross-sectional contour are put between the rollers 53 and the side of the foundation, and then rolled into place as rings adherent to the tubular, annular foundation formed by reversely winding the strips or windings 50 and 51, one over the other, spirally and lapping. Each bead-forming strip is simultaneously bent into annular form and pressed in place by the operation of the rollers 53. When one layer has been spirally wound, a fresh spool or a fresh strip end is pressed on the first-laid strip, and the machine reversed either in respect of the mandrel or spool-carrier, and in any event the tape or strip of frictional material is wound under tension at all stages of building up the carcass.

When the clencher bead-forming strips have been laid or rolled in place, further reverse-spiral windings 54 and 55 (as many alternating, overlapping strips as desired,) are put in place; the rollers 53 being thrown out of use or into idle position, as shown in Fig. 1. In Fig. 5 they are shown in working position. Each is loosely mounted on a journal 56 hinged at 57 to a suitable bracket 58 and held up to their work by a spring 59 that is detachable, so that instead of pulling the journals 56 toward one another and the intermediate portion of the mandrel, the journals may fall away from each other into idle position.

The peripheral work surfaces of the rollers 53 have a shape that corresponds to the exterior wall (of the vulcanizable rubber bead strip) that lies between its upper or grooved edge and its inner edge, and does not engage the outer peripheral wall; that is, the wall of the groove of the bead-forming strip. As these strips are pre-formed with continuous grooves along their outer peripheral edges, it is important not to deform them when they are rolled in place; and it is also desirable that the rollers 53 should be held up to their work elastically, as by spring 59, in order to minimize the deformation due to the pressure of the rollers on the pre-formed bead-strips.

When the carcass has been built up, it is initially in the form of an annular tube with clencher bead rings between the foundation and outer plies. To convert this tube into shoe-form, it is cut around its inner periphery, as by a rotary cutter 59, the mandrel having an inner peripheral slit 60 to permit this operation. The mandrel is preferably of knock-down or collapsible type, comprising segments $m$, $m'$ and $m^2$ and fasteners $m^3$, to permit removal of the shoes at the proper time. After trimming and working the edges of the peripherally slit tube into shape to shape the margins of the outer plies to the foundation and bead rings, or before so doing, the usual rubber, annular tread will be stretched in place around the outer periphery of the carcass; and thereafter the whole may be cured in molds, or be wrapped by the present machine preliminary to vulcanization. It will be observed that the spool is carried positively by its carrier. This is desirable for the best results, because the tapes or strips are thereby pulled tightly in place around the mandrel, tightly upon one another, so as to make the carcass very compact.

If desired, annular bead-supporting rings 61 may be used to hold the bead rings in place, these rings to be removed after the initially formed, annular tube is slit around its inner circumference. In practice we find these bead rings important because if they are not used, the bead-forming strips 52 of unvulcanized rubber are apt to be deformed by the compression to which they are, in such case, subjected by the strain of the supplementary or outer windings. The two rings 61 are chamfered and slightly held apart (by the beads 52) at their opposed inner edges, at 62, opposite the inner peripheral cutter-receiving slit 60 of the collapsible mandrel, so that the cutter 59 can pass first through the outer winding or shell, then between the opposed edges of the bead rings 61, and then through the inner winding into the slit 60, which affords a clearance for the cutter. The rings 52 are made of relatively thin stock, and ought to be, as shown, of uniform thickness throughout their annular and cross-sectional extent so as not to involve the use of unnecessary material. Their interior surfaces should be laterally curving, as shown, so as to permit tight winding, over curving surfaces, of the outermost strips. The bead-ring support also functions as a rigid purchase around the inner periphery of the shoe while the exterior strips are being wound in place.

We find, in practice, that in many sizes of shoes made in accordance with the hereinbefore-described method and by use of the said machine, it is exceedingly difficult to remove the shoe carcass from molds that are not collapsible. However, in the building of light-weight shoe carcasses, solid continuous, that is, non-collapsible, molds may be used; but in making heavy shoe carcasses for use on motor cars, the tightness with which the strips are wound in place makes the marginal portions of the shoes stiff enough to strongly resist the removal of such shoe carcasses from non-collapsible mandrels without an undue amount of labor and without some material danger of deforming the then unvulcanized portions of the shoe.

What we claim is:—

1. The combination of an arcuate circular spool-carrier support; an arcuate circular spool-carrier rotatably mounted thereon; a spool on said carrier; a frame carrying said support; a plurality of rollers for supporting an annular mandrel; an annular mandrel rotatably mounted on the rollers, encircling an arc of the spool-carrier support and spool-carrier, and formed with an inner peripheral cutter-receiving slit; means for rotating the rollers simultaneously in the same direction; means for rotating the spool-carrier; and means for reversing the rotary movement of the spool-carrier and rollers, in relation one to the other.

2. The combination of an arcuate circular spool-carrier support; an arcuate circular spool-carrier rotatably mounted thereon; a spool on said carrier; a frame carrying said support; a plurality of rollers for supporting an annular mandrel; an annular mandrel rotatably mounted on the rollers, encircling an arc of the spool-carrier support and spool-carrier and formed with an inner peripheral cutter-receiving slit; means for rotating the rollers simultaneously in the same direction; means for rotating the spool-carrier; and means for reversing the rotary movement of the spool-carrier and rollers, in relation one to the other; the spool projecting laterally of the spool-carrier and its support, and the mandrel-carrying rollers being spaced apart at opposite ends of the spool-carrier and its support.

3. The combination of an arcuate circular spool-carrier; a support therefor; a spool on the carrier; an annular collapsible mandrel; means for rotating, and means for reversing the rotation of the mandrel, the latter being provided with an inner peripheral cutter-receiving slit.

4. The combination of a spool-carrier; a support therefor; means for holding and supporting an annular mandrel in position to permit the spool to be carried transversely around it; means for rotating the carrier and mandrel one in relation to the other; rolls for simultaneously curving bead-forming strips and pressing them on the carcass sides; said rolls being mounted on hinged journals; and a spring for connecting the journals to hold the rolls elastically in working position.

5. The combination in a tire-shoe building machine of a spool-carrier; a support therefor; means for holding and supporting an annular mandrel in position to permit the spool to be carried transversely around it; means for rotating the carrier and mandrel one in relation to the other; and a removable, annular bead-ring support located within the mandrel and rotatable with it; said support comprising two rings the opposed inner edges of which are located to permit the passage of a cutter between them.

6. The combination of a suitable frame with a therein mounted drive-shaft provided with a power-transmission device; an arcuate, circular spool-carrier support; an arcuate, circular spool-carrier movably mounted thereon; a work-supporting roll at each end of the spool-carrier, for supporting a mandrel or other annular device adapted to encircle an arc of the assembled spool-carrier and spool in the operation of the machine; a spool on said carrier; means for moving the spool-carrier on its support; a spool drive and shift mechanism operatively mounted between said means and the drive shaft; a shaft for each of said work-supporting rolls, each shaft being provided with a power-transmission device; a shaft operatively connected with each of said power-transmission devices for driving the roll shafts simultaneously; a shaft operatively connected with the drive shaft; and, between said last shaft and the shaft for driving the roll shafts simultaneously, a mandrel drive and shift mechanism.

7. The combination of an arcuate circular spool-carrier; a support therefor; a spool on the carrier; an annular collapsible mandrel; means for rotating, and means for reversing the rotation of, the mandrel, the mandrel having an inner peripheral cutter-receiving slit; and a cutter.

8. The combination of an arcuate circular spool-carrier; a support therefor; a spool on the carrier; an annular collapsible mandrel; means for rotating the carrier; means for rotating the mandrel; and a removable, annular bead ring support located within the mandrel and rotatable with it.

9. The combination, in a tire-shoe building machine, of an annular collapsible mandrel having an inner peripheral cutter-receiving slit; and an annular laterally separable bead-ring support mounted within and rotatable with the mandrel; the inner opposed edges of the support members being opposite the cutter-receiving slit; and means for directing a shoe-forming element to the assembled mandrel and bead-ring support; and mechanism for winding such element progressively around the assembled mandrel and bead-ring support.

10. The combination, in a tire-shoe building machine, of an annular, collapsible mandrel having an inner peripheral, cutter-receiving slit; with means for directing a shoe-forming element to the mandrel, and mechanism for winding the element progressively around the mandrel to form an endless annular tube thereon and therearound.

11. The combination, in a tire-shoe building machine, of an annular mandrel; an interiorly mounted, removable annulus, the exterior diameter of which is less than the interior diameter of the mandrel to form a shoe carcass receiving space, said interior annulus serving as a bead-ring support and also as a purchase during the winding around the mandrel, the interior ring and contained carcass of a shoe carcass forming element; means for rotating the mandrel and a winding mechanism one in relation to the other to apply, in the form of an endless annular tube, a shoe-forming element circumferentially and transversely around the mandrel, interior ring and contained carcass; and said winding mechanism.

In testimony whereof we have hereunto affixed our respective signatures, in presence of two witnesses:

ROBERT ROWLEY.
JAMES J. COOMBER.

Witnesses:
EDWARD E. BLACK,
EDWARD S. BEACH.